(12) United States Patent
Kusui

(10) Patent No.: US 8,688,173 B2
(45) Date of Patent: Apr. 1, 2014

(54) MOBILE PHONE, OUTPUT CONTROL METHOD, AND RECORDING MEDIUM

(71) Applicant: KYOCERA Corporation, Kyoto (JP)

(72) Inventor: Akihiro Kusui, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/629,137

(22) Filed: Sep. 27, 2012

(65) Prior Publication Data

US 2013/0079064 A1    Mar. 28, 2013

(30) Foreign Application Priority Data

Sep. 28, 2011    (JP) .................... 2011-212467

(51) Int. Cl.
*H04W 88/02*    (2009.01)
(52) U.S. Cl.
USPC ........................................... 455/567
(58) Field of Classification Search
USPC ...................... 455/567, 401, 412.2
See application file for complete search history.

(56) References Cited

U.S. PATENT DOCUMENTS

| | | | |
|---|---|---|---|
| 8,452,346 B1* | 5/2013 | Lin | 455/567 |
| 2004/0091026 A1* | 5/2004 | Nakayama | 375/148 |
| 2006/0111085 A1* | 5/2006 | Lee | 455/412.2 |
| 2006/0128439 A1* | 6/2006 | Lee | 455/567 |
| 2008/0057902 A1* | 3/2008 | Sidon | 455/401 |
| 2010/0226304 A1* | 9/2010 | Shoji | 370/315 |
| 2011/0151940 A1* | 6/2011 | Frohlich | 455/567 |
| 2011/0254753 A1* | 10/2011 | Ozone et al. | 343/861 |

FOREIGN PATENT DOCUMENTS

JP    2003-244280 A    8/2003

* cited by examiner

*Primary Examiner* — Diane Mizrahi
(74) *Attorney, Agent, or Firm* — Procopio, Cory, Hargreaves & Savitch LLP

(57) ABSTRACT

Provided is a mobile phone that comprises: a speaker; and an audio data storage unit configured to store therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator, specifies, when an incoming communication is received, from among the levels, a level of the relative communication reception frequency for an originator of the received incoming communication, and outputs a ringtone from the speaker based on one of the audio data pieces corresponding to the specified level.

9 Claims, 14 Drawing Sheets

FIG. 3A

Address book

| No. 11 | Name 12 | Phone number 13 | Mail address 14 |
|---|---|---|---|
| 1 | Person A | 090****1111 | a*a@bbb.com |
| 2 | Person B | 090****2222 | c*c@ddd.co.jp |
| 3 | Person C | 090****3333 | e*e@fff.ne.jp |
| ... | ... | ... | ... |

FIG. 3B

Particular originator information

| 1 |
|---|

Frequency table

| No. 31 | Call reception frequency 32 | Mail reception frequency 33 | Call reception ratio 34 | Mail reception ratio 35 |
|---|---|---|---|---|
| 1 | 10 | 22 | 100 | 100 |
| 2 | 1 | 5 | 10 | 23 |
| 3 | 21 | 7 | 210 | 32 |
| ... | ... | ... | ... | ... |

Call history table 40

| Reception date and time 41 | Originator number 42 |
|---|---|
| ... | ... |
| 2011/8/1 9:01 | 090****1111 |
| 2011/8/1 9:35 | 090****3333 |
| 2011/8/2 11:35 | 090****1111 |
| ... | ... |

FIG. 4B

Mail history table 50

| Reception date and time 51 | Originator address 52 |
|---|---|
| ... | ... |
| 2011/8/1 8:50 | a*a@bbb.com |
| 2011/8/1 9:20 | a*a@bbb.com |
| 2011/8/1 16:12 | c*c@ddd.co.jp |
| ... | ... |

FIG. 4C

Call ringtone table 60

| Level 61 | Audio data 62 |
|---|---|
| 170~210 | D |
| 129~169 | B |
| 88~128 | A |
| 47~87 | C |
| 6~46 | E |

FIG. 4D

Mail ringtone table 70

| Level 71 | Audio data 72 |
|---|---|
| 85~100 | G |
| 69~84 | H |
| 53~68 | F |
| 37~52 | J |
| 21~36 | I |

FIG. 7A

| Set call ringtone | |
|---|---|
| Level | Audio data |
| 170~210 | |
| 129~169 | |
| 88~128 | ▨ ← K10 |
| 47~87 | |
| 6~46 | |

FIG. 7B

Select audio data

| A (K20) | B | C |
|---|---|---|
| D | E | F |
| G | H | I |
| J | K | L |

FIG. 7C

| Set call ringtone | |
|---|---|
| Level | Audio data |
| 170~210 | |
| 129~169 | |
| 88~128 | A |
| 47~87 | |
| 6~46 | |

FIG. 10A

Frequency table 36

| No. 31 | Communication reception frequency 37 | Communication reception ratio 38 |
|---|---|---|
| 1 | 32 | 100 |
| 2 | 6 | 19 |
| 3 | 28 | 88 |
| ... | ... | ... |

FIG. 10B

History table 45

| Reception date and time 41 | Originator 46 |
|---|---|
| ... | ... |
| 2011/8/1 8:50 | a*a@bbb.com |
| 2011/8/1 9:01 | 090****1111 |
| 2011/8/1 9:20 | a*a@bbb.com |
| 2011/8/1 9:35 | 090****3333 |
| 2011/8/1 16:12 | c*c@ddd.co.jp |
| 2011/8/2 11:35 | 090****1111 |
| ... | ... |

FIG. 10C

Ringtone table 66

| Level 67 | Audio data 68 |
|---|---|
| 84~100 | A |
| 67~83 | C |
| 50~66 | D |
| 33~49 | B |
| 16~32 | E |

FIG. 14A

Ringtone table

| Level | Audio data |
|---|---|
| 121~ | B |
| 81~120 | C |
| 61~80 | A |
| 41~60 | D |
| ~40 | E |

FIG. 14B

Ringtone table

| Level | Audio data |
|---|---|
| 200~ | B |
| 101~199 | C |
| 100 | A |
| 51~99 | D |
| ~50 | E |

US 8,688,173 B2

MOBILE PHONE, OUTPUT CONTROL METHOD, AND RECORDING MEDIUM

CROSS REFERENCE TO RELATED APPLICATION

This application is based on applications No. 2011-212467 and No. 2012-180366 filed in Japan, the contents of which are hereby incorporated by reference.

TECHNICAL FIELD

The present invention relates to a mobile phone, and in particular to technology for determining a ringtone output when an incoming call or mail is received.

BACKGROUND ART

In recent years, a plurality of audio data pieces have been stored in mobile phones, as services for downloading, over the Internet, audio data pieces used as ringtones for mobile phones have been provided.

Technology for utilizing a plurality of stored audio data pieces is known (e.g. Patent Literature 1).

With the technology disclosed in Patent Literature 1, for each of five groups into which contact information pieces for communication partners listed in an address book are classified, an information piece indicating a ringtone to be played when each of four conditions regarding a communication reception history (e.g. the number of received incoming communications, and intervals at which incoming communications have been received) is met is registered, and a ringtone to be output when an incoming communication is received is changed based on the communication reception history of an originator of the incoming communication.

This technology enables a mobile phone to output a ringtone by using a plurality of audio data pieces stored therein.

CITATION LIST

Patent Literature

[Patent Literature 1]
Japanese Patent Application Publication No. 2003-244280

SUMMARY OF INVENTION

Technical Problem

Some users hope to use ringtones for mobile phones to know the communication reception history of an originator, and, in order to respond to such a demand, implementation of the above-mentioned technology disclosed in Patent Literature 1 is expected.

According to the technology disclosed in Patent Literature 1, however, since a ringtone to be played when each of the four conditions is met is defined for each of the five groups, 20 combinations are possible. This makes it difficult for a mobile phone user to know the communication reception history of an originator from a ringtone.

A mobile phone user generally hopes to respond to an incoming communication from a particular originator such as a family member and a boyfriend/girlfriend as quickly as possible. It is therefore desirable that a mobile phone user can know an incoming communication from a particular originator from a ringtone.

With the technology disclosed in Patent Literature 1, however, it is difficult for a mobile phone user to know an incoming communication from a particular originator from a ringtone, because a ringtone is output according to the communication reception history also when an incoming communication is received from the particular originator.

The present invention aims to provide a mobile phone that enables a mobile phone user to know the communication reception history of an originator from a ringtone and to easily identify an incoming communication from a particular originator.

Solution to Problem

In order to solve the above-mentioned problem, one aspect of the present invention is a mobile phone comprising: a speaker; an audio data storage unit configured to store therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator; and an output control unit configured to, when an incoming communication is received, specify, from among the levels, a level of the relative communication reception frequency for an originator of the received incoming communication, and output a ringtone from the speaker based on one of the audio data pieces corresponding to the specified level.

Advantageous Effects of Invention

The mobile phone of the present invention having the above-mentioned configuration enables a mobile phone user to know the communication reception history of an originator from a ringtone and to easily identify an incoming communication from a particular originator.

BRIEF DESCRIPTION OF DRAWINGS

FIGS. 3A, 3B, and 3C respectively show the data structure and an example of an address book 10, an example of particular originator information 20, and the data structure and an example of a frequency table 30.

FIGS. 4A, 4B, 4C, and 4D respectively show the data structure and an example of a call history table 40, the data structure and an example of a mail history table 50, the data structure and an example of a call ringtone table 60, and the data structure and an example of a mail ringtone table 70.

FIGS. 7A, 7B, and 7C respectively show a call ringtone setting screen G10, an audio data selection screen G20, and a call ringtone setting screen G11 of the mobile phone 100.

FIGS. 10A, 10B, and 10C respectively show the data structure and an example of a frequency table 36, the data structure and an example of a history table 45, the data structure and an example of a ringtone table 66.

FIGS. 14A and 14B respectively show an example of a ringtone table 80 and an example of a ringtone table 85 in other modifications.

DESCRIPTION OF EMBODIMENTS

The following describes an embodiment of a mobile phone of the present invention.

<<Embodiment>>

<1. Overview>

The mobile phone in the embodiment outputs a ringtone according to relative communication reception frequency. The relative communication reception frequency is calculated for each of a plurality of originators and indicates a ratio of frequency of receiving incoming communications from the originator (hereinafter, referred to as "communication reception frequency" for the originator) to the communication reception frequency for a particular originator designated in advance by a user of the mobile phone.

To this end, the mobile phone has stored therein a plurality of ringtones in one-to-one correspondence with a plurality of levels of the relative communication reception frequency.

By memorizing the correspondence between the levels and the ringtones when designating, as a particular originator, a person whose communication reception frequency is known by a user to some extent, such as a family member and a boyfriend/girlfriend, the user can recognize the communication reception frequency for an originator from a ringtone. For example, when a user is notified by a ringtone of an incoming communication from an originator X, if the ringtone is the same as a ringtone notifying the user of an incoming communication from a particular originator, it is easy for the user to know that the communication reception frequency for the originator X is similar to the communication reception frequency for the particular originator.

Even if the communication reception frequency for a particular originator changes, it is possible to output the same ringtone every time an incoming communication is received from the particular originator, because the relative communication reception frequency for the particular originator, which indicates a ratio of the communication reception frequency for the particular originator to the communication reception frequency for the particular originator, does not change (100%). A user of the mobile phone can therefore instantly know an incoming communication from an originator who is likely to be the particular originator from a ringtone.

In the present embodiment, description is made by using the communication reception frequency as an example of the communication reception history.

<2. Device Configuration>

The configuration of a mobile phone 100 in the embodiment is described first.

Figure 1A:
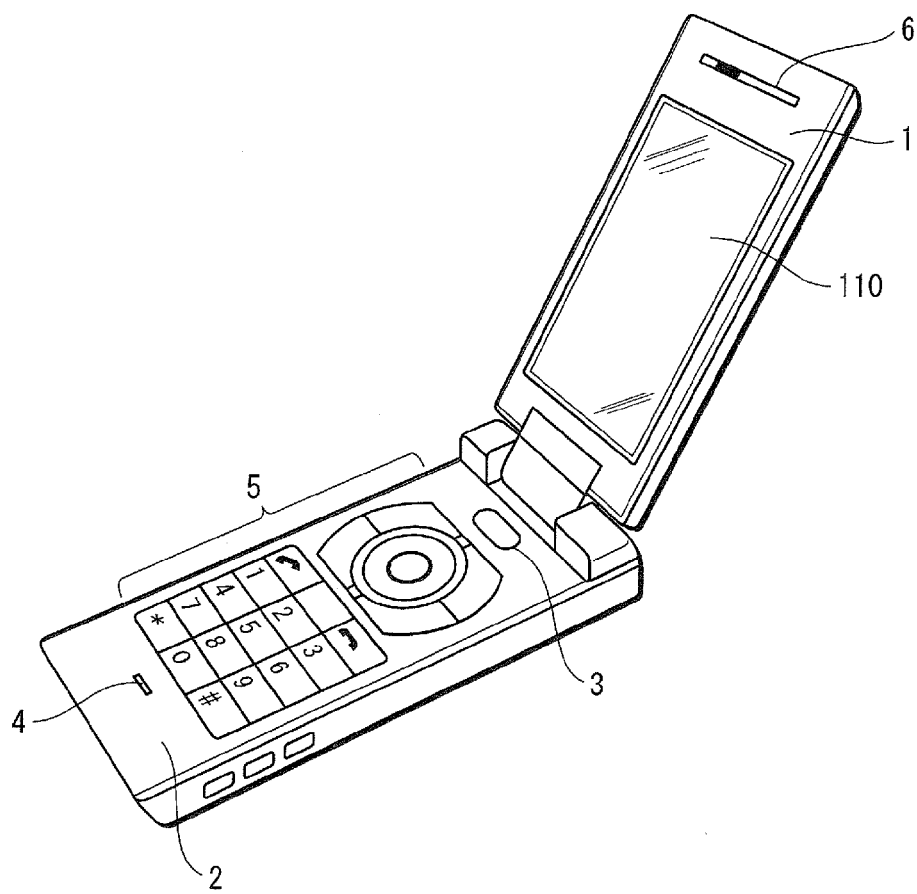
FIG. 1A shows an appearance of a mobile phone 100 in an embodiment in an open state.
Figure 1B:
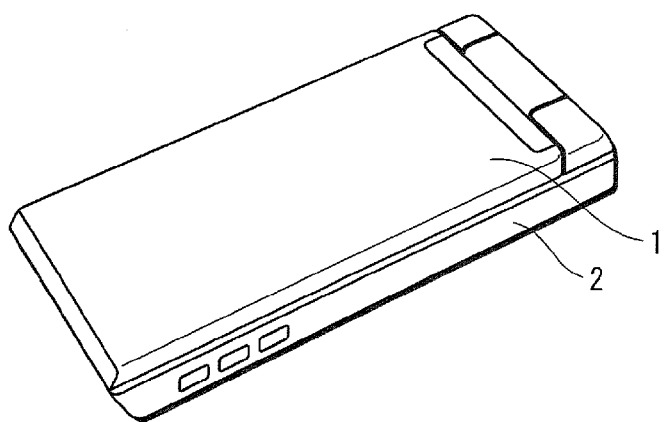
FIG. 1B shows an appearance of the mobile phone 100 in the embodiment in a closed state.

FIG. 1A is a perspective view showing an appearance of the mobile phone 100 in an open state, and FIG. 1B is a perspective view showing an appearance of the mobile phone 100 in a closed state.

As shown in FIGS. 1A and 1B, the mobile phone 100 is a so-called clamshell terminal composed of a first housing 1 and a second housing 2.

The first housing 1 is equipped with a receiver 6 and a display screen 110. The second housing 2 is equipped with a speaker 3, a microphone 4, and a set of keys 5.

The mobile phone 100 is changed from a closed state shown in FIG. 1B, in which the display screen 110 is invisible, to an open state shown in FIG. 1A, in which the display screen 110 is visible, by a user opening the first housing 1.

<3. Functional Structure>

Figure 2:
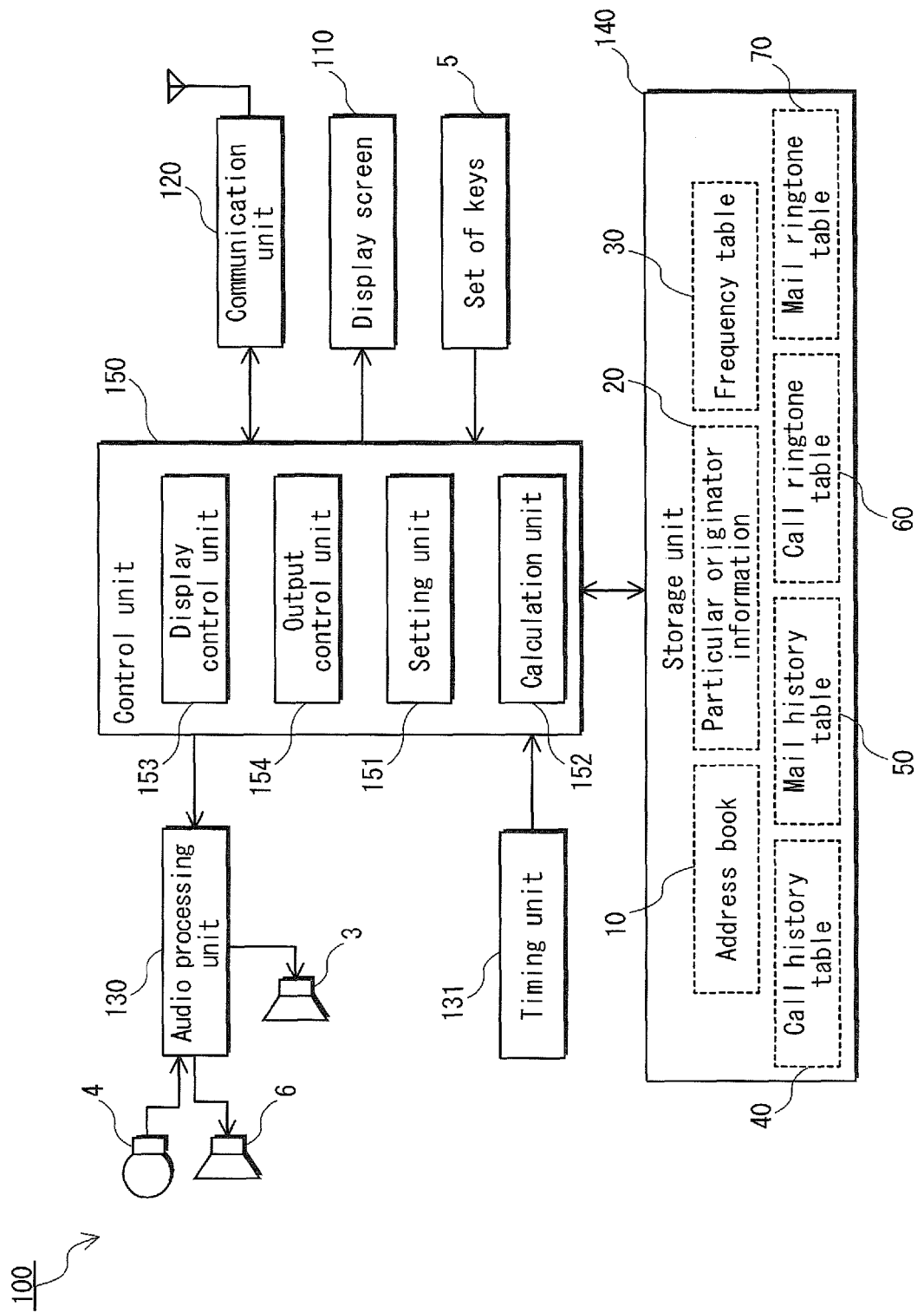
FIG. 2 is a block diagram showing the functional structure of main components of the mobile phone 100.

FIG. 2 is a block diagram showing the functional structure of main components of the mobile phone 100.

As shown in FIG. 2, the mobile phone 100 includes the speaker 3, the microphone 4, the set of keys 5, the receiver 6, the display screen 110, a communication unit 120, an audio processing unit 130, a timing unit 131, a storage unit 140, and a control unit 150.

The mobile phone 100 includes a processor and memory. By the processor executing a program stored in the memory, functions of the control unit 150 are implemented.

The set of keys 5 transmits an input signal corresponding to a key pressed by a user to the control unit 150.

The display screen 110 includes an LCD (Liquid Crystal Display) and displays thereon an image according to an instruction from the control unit 150.

The communication unit 120 is a circuit that transmits/receives radio waves to/from a base station via an antenna. The communication unit 120 demodulates a received signal and transmits the demodulated signal to the control unit 150, and modulates a transmitted signal received from the control unit 150 and transmits the modulated signal.

The audio processing unit 130 performs D/A conversion on a talk signal received from the control unit 150 and outputs the converted signal from the receiver 6, and performs A/D conversion on an audio signal input from the microphone 4 and transmits the converted signal to the control unit 150. The audio processing unit 130 also outputs a ringtone from the speaker 3 according to an instruction from the control unit 150.

The timing unit 131 is a clock, and measures a current date and time.

The storage unit 140 is a memory area for storing therein an address book 10, particular originator information 20, a frequency table 30, a call history table 40, a mail history table 50, a call ringtone table 60, and a mail ringtone table 70. The address book 10, the particular originator information 20, the frequency table 30, the call history table 40, the mail history table 50, the call ringtone table 60, and the mail ringtone table 70 are briefly described here, because they are described in detail later with use of FIGS. 3A, 3B, 3C, 4A, 4B, 4C, and 4D.

A name, a phone number, a mail address and the like of each communication partner are registered with the address book 10. The particular originator information 20 indicates a particular originator designated by a user. With the frequency table 30, the communication reception frequency for each communication partner and the relative communication reception frequency for the communication partner, which indicates a ratio of the communication reception frequency for the communication partner to the communication reception frequency for a particular originator, are registered with respect to each of an incoming call and an incoming mail.

A call reception history and a mail reception history are registered with the call history table 40 and the mail history table 50, respectively.

With the call ringtone table 60, a plurality of ringtones are registered in one-to-one correspondence with a plurality of levels of relative call reception frequency. With the mail ringtone table 70, a plurality of ringtones are registered in one-to-one correspondence with a plurality of levels of relative mail reception frequency. The relative call reception frequency is calculated for each originator and indicates a ratio of frequency of receiving incoming calls from the originator (hereinafter, referred to as "call reception frequency" for the originator) to the call reception frequency for a particular originator. The relative mail reception frequency is calculated for each originator and indicates a ratio of frequency of receiving incoming mails from the originator (hereinafter, referred to as "mail reception frequency" for the originator) to the mail reception frequency for a particular originator.

Hereinafter, the call history table 40 and the mail history table 50 are collectively referred to as a "history table", and the call ringtone table 60 and the mail ringtone table 70 are collectively referred to as a "ringtone table".

In the present embodiment, an audio data piece refers to a data piece for a ringtone stored in a predetermined memory area of the mobile phone 100. By playing back the audio data piece, a sound characterized by its pitch (frequency) and tone is output. The predetermined memory area includes not only a given area on internal memory of the mobile phone 100 but also a given area on a memory card, such as an SD memory card, that is attachable to the mobile phone 100. Audio data pieces are distinguished from one another in units of files.

In addition to functions that a typical mobile phone has, such as a function to detect an incoming call or mail based on a signal received from a base station via the communication unit 120 and a function to update each history table, the control unit 150 has a function to output, via the audio processing unit 130, a ringtone according to the relative communication reception frequency for an originator. The control unit 150 includes a setting unit 151, a calculation unit 152, a display control unit 153, and an output control unit 154.

The setting unit 151 registers, with each of the call ringtone table 60 and the mail ringtone table 70, audio data pieces in one-to-one correspondence with the levels according to user operation.

The calculation unit 152 calculates, at regular time intervals (e.g. once a week), the communication reception frequency and the relative communication reception frequency for each communication partner during a time period from a given time point in the past to the present with respect to each of an incoming call and an incoming mail, and updates the frequency table 30.

The display control unit 153 displays a screen on the display screen 110 according to a processing result.

When an incoming communication is received, the output control unit 154 specifies an audio data piece corresponding to the relative communication reception frequency for an originator of the received incoming communication based on the frequency table 30 and the ringtone table 60 or 70, and outputs a ringtone from the speaker 3 via the audio processing unit 130 based on the specified audio data piece.

<4. Data>

The following describes data pieces used by the mobile phone 100 with use of FIGS. 3A, 3B, 3C, 4A, 4B, 4C, and 4D.

<4-1. Address Book 10>

FIG. 3A shows the data structure and an example of the address book 10.

As shown in FIG. 3A, the address book 10 includes a number 11, a name 12, a phone number 13, and a mail address 14.

Hereinafter, information for one registrant including a number, a name, a phone number, and a mail address registered in correspondence with one another is also referred to as a "record".

The number 11 is identification information for identifying each communication partner as a potential originator. In the present embodiment, the number 11 is a number starting with one and incremented by one in the order records have been registered.

The name 12 is a name of a communication partner identified by a corresponding number. The phone number 13 is a phone number assigned to a telephone owned by a corresponding communication partner. The mail address 14 is a mail address owned by a corresponding communication partner.

FIG. 3A shows, for example, that a name, a phone number, and a mail address of a communication partner whose number is "1" are "Person A", "090****1111", and "a*a@bbb.com", respectively.

<4-2. Particular Originator Information 20>

FIG. 3B shows an example of the particular originator information 20.

The particular originator information 20 indicates a particular originator selected in advance by a user, and corresponds to one of the numbers registered with the address book 10. FIG. 3B shows that a particular originator indicated by the particular originator information 20 is a communication partner whose number is "1" (i.e. Person A).

<4-3. Frequency Table 30>

FIG. 3C shows the data structure and an example of the frequency table 30.

As shown in FIG. 3C, the frequency table 30 is information including a number 31, call reception frequency 32, mail reception frequency 33, a call reception ratio 34, and a mail reception ratio 35.

The number 31 is identification information for identifying each communication partner as a potential originator. The number 31 corresponds to the number 11 included in the address book 10.

The call reception frequency 32 is information indicating the number of incoming calls received from a communication partner identified by a corresponding number during a given time period. The mail reception frequency 33 is information indicating the number of incoming mails received from a communication partner identified by a corresponding number during a given time period.

The call reception ratio 34 is information indicating a ratio (%) of the number of received incoming calls indicated by the call reception frequency for a corresponding originator to the number of received incoming calls indicated by the call reception frequency for a particular originator indicated by the particular originator information 20. The call reception ratio 34 is therefore information indicating the relative call reception frequency for each communication partner.

The mail reception ratio 35 is information indicating a ratio (%) of the number of received incoming mails indicated by the mail reception frequency for a corresponding originator to the number of received incoming mails indicated by the mail reception frequency for a particular originator indicated by the particular originator information 20. The mail reception ratio 35 is therefore information indicating the relative mail reception frequency for each communication partner.

FIG. 3C shows, for example, that the call reception frequency, the mail reception frequency, the call reception ratio, and the mail reception ratio for a communication partner whose number is "1" (i.e. Person A) are "10", "22", "100 (=10/10×100)"%, and "100 (=22/22×100)"%, respectively. The call reception ratio and the mail reception ratio are each "100"% in this example because the particular originator information 20 of FIG. 3B shows that the communication partner whose number is "1" is a particular originator.

FIG. 3C also shows, for example, that the call reception frequency, the mail reception frequency, the call reception ratio, and the mail reception ratio for a communication partner whose number is "2" (i.e. Person B) are "1", "5", "10 (=1/10×100)"%, and "23 (≈5/22×100)"%, respectively.

The call reception ratio and the mail reception ratio each indicate a value obtained by rounding up a decimal point.

<4-4. Call History Table 40>

FIG. 4A shows the data structure and an example of the call history table 40.

As shown in FIG. 4A, the call history table 40 is information including a reception date and time 41, and an originator number 42.

In the present application, information for one call including a reception date and time, and an originator number registered in correspondence with each other (i.e. a record) is also referred to as a "call history".

The reception date and time 41 is information indicating a date and time when each incoming call has been received. The originator number 42 is information indicating a phone number of an originator who has made an incoming call at a corresponding date and time.

FIG. 4A shows that an originator number of an incoming call whose reception date and time is "2011/8/1 9:01" is "090****1111" (i.e. an originator of the incoming call is Person A).

<4-5. Mail History Table 50>

FIG. 4B shows the data structure and an example of the mail history table 50.

As shown in FIG. 4B, the mail history table 50 is information including a reception date and time 51, and an originator address 52.

In the present application, information for one mail including a reception date and time, and an originator address registered in correspondence with each other (i.e. a record) is also referred to as a "mail history".

The reception date and time 51 is information indicating a date and time when each incoming mail has been received. The originator address 52 is information indicating a mail address of an originator who has sent an incoming mail at a corresponding date and time.

FIG. 4B shows, for example, that an originator address of an incoming mail whose reception date and time is "2011/8/1 8:50" is "a*a@bbb.com" (i.e. an originator of the incoming mail is Person A).

<4-6. Call Ringtone Table 60>

FIG. 4C shows the data structure and an example of the call ringtone table 60.

As shown in FIG. 4C, the call ringtone table 60 is information including a level 61 and audio data 62.

The level 61 is information indicating levels of the relative call reception frequency. The audio data 62 is information indicating audio data pieces each output as a ringtone when the relative call reception frequency for an originator is within a range indicated by a corresponding level.

FIG. 4C shows, for example, that a ringtone is output based on an audio data piece "D" when a level is "equal to or greater than 170% and equal to or smaller than 210%".

<4-7. Mail Ringtone Table 70>

FIG. 4D shows the data structure and an example of the mail ringtone table 70.

As shown in FIG. 4D, the mail ringtone table 70 is information including a level 71 and audio data 72.

The level 71 is information indicating levels of the relative mail reception frequency. The audio data 62 is information indicating audio data pieces each output as a ringtone when the relative mail reception frequency for an originator is within a range indicated by a corresponding level.

FIG. 4D shows, for example, that a ringtone is output based on an audio data piece "G" when a level is "equal to or greater than 85% and equal to or smaller than 100%".

<5. Operation>

Operation of the mobile phone 100 having the above-mentioned configuration is described with use of FIGS. 5, 6, 7A, 7B, 7C, and 8.

<5-1. Calculation Processing>

Calculation processing is described first.

Figure 5:
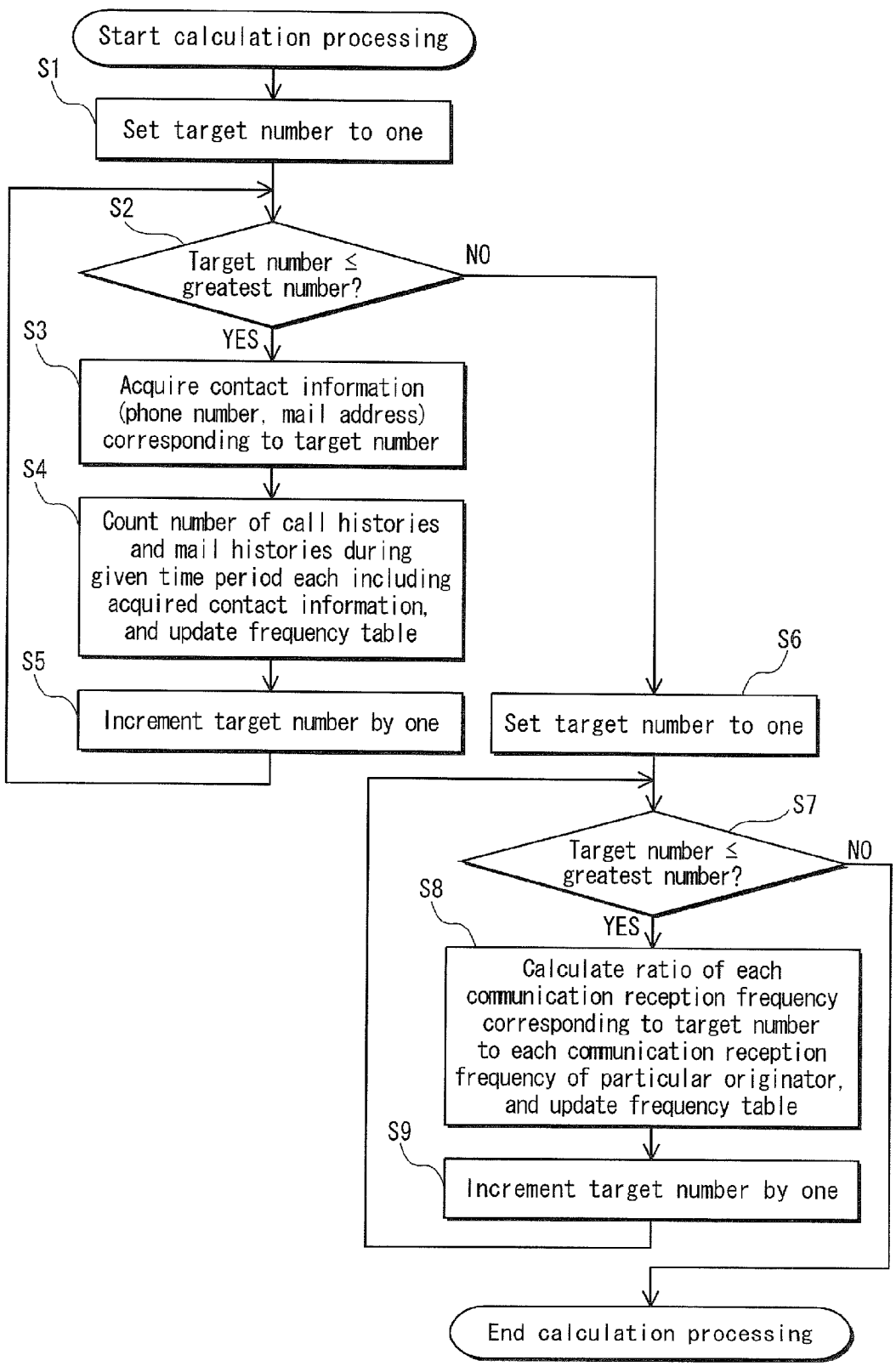
FIG. 5 is a flow chart showing calculation processing performed by a control unit 150 included in the mobile phone 100.

FIG. 5 is a flow chart showing calculation processing performed by the control unit 150 included in the mobile phone 100.

The calculation processing shown in FIG. 5 is performed at regular time intervals after a user first starts using the mobile phone 100.

Once the calculation processing is started, the calculation unit 152 included in the control unit 150 acquires a current date and time from the timing unit 131, and initializes a number indicating a communication partner targeted for the processing (hereinafter, referred to as a target number) to "1" (step S1).

The calculation unit 152 judges whether or not the target number is equal to or smaller than the greatest number of all the numbers registered with the address book 10 (step S2).

When judging that the target number is equal to or smaller than the greatest number (step S2: YES), the calculation unit 152 acquires, from the address book 10, a phone number and a mail address registered in correspondence with a number identical to the target number (step S3).

For example, when the target number is "1", the calculation unit 152 acquires "090****1111" as a phone number and "a*a@bbb.com" as a mail address.

The calculation unit 152 then counts the number of records including the phone number acquired in the step S3 in the originator number and including a reception date and time during a time period from a given time point in the past to the present indicated by the acquired current date and time, i.e. the number of call histories, with reference to the call history table 40. The calculation unit 152 also counts the number of records including the mail address acquired in the step S3 in the originator address and including a reception date and time during the time period from the given time point in the past to the present indicated by the acquired current date and time, i.e. the number of mail histories, with reference to the mail history table 50.

The calculation unit 152 updates the call reception frequency and the mail reception frequency registered, with the frequency table 30, in correspondence with a number identical to the target number to the counted number of call histories and the counted number of mail histories, respectively (step S4), increments the target number by one (step S5), and performs the processing in the step S2 again.

When the target number is judged to be greater than the greatest number (step S2: NO), calculation of the call reception frequency and the mail reception frequency for each communication partner is completed.

The calculation unit 152 then initializes the target number to "1" to update the call reception ratio and the mail reception ratio for each communication partner included in the frequency table 30, similarly to the processing in the step S1 (step S6). The calculation unit 152 also judges whether or not the target number is equal to or smaller than the greatest number, similarly to the processing in the step S2 (step S7).

When judging that the target number is equal to or smaller than the greatest number (step S7: YES), the calculation unit 152 calculates a call reception ratio pRt, which is registered with the frequency table 30, of call reception frequency pFt of an originator identified by the target number, to call reception frequency pFs of a particular originator indicated by the particular originator information 20 as follows: pRt=pFt/pFs× 100. Similarly, the calculation unit 152 calculates a mail reception ratio mRt, which is registered with the frequency table 30, of mail reception frequency mFt of the originator identified by the target number, to mail reception frequency mFs of the particular originator indicated by the particular originator information 20 as follows: mRt=mFt/mFs×100.

Since the particular originator information 20 indicates "1" in an example shown in FIG. 3B, the call reception frequency pFs and the mail reception frequency mFs of the particular originator are "10" and "22", respectively, according to the frequency table 30 shown in FIG. 3C. When the target number is "2", the call reception frequency pFt and the mail reception frequency mFt are "1" and "5", respectively, according to the frequency table 30 shown in FIG. 3C. The call reception ratio pRt and the mail reception ratio mRt are therefore respectively calculated as "10 (=1/10×100)" and "23 (≈5/22×100)".

The calculation unit 152 updates the call reception ratio and the mail reception ratio registered, with the frequency table 30, in correspondence with a number identical to the target number to the calculated ratios pRt and mRt, respectively (step S8), increments the target number by one similarly to the processing in the step S5 (step S9), and performs the processing in the step S7 again.

When the target number is judged to be greater than the greatest number (step S7: NO), calculation of the call reception ratio and the mail reception ratio for each communication partner is completed. The calculation unit 152 thus ends the calculation processing.

<5-2. Setting Processing>

Setting processing is described next.

Figure 6:
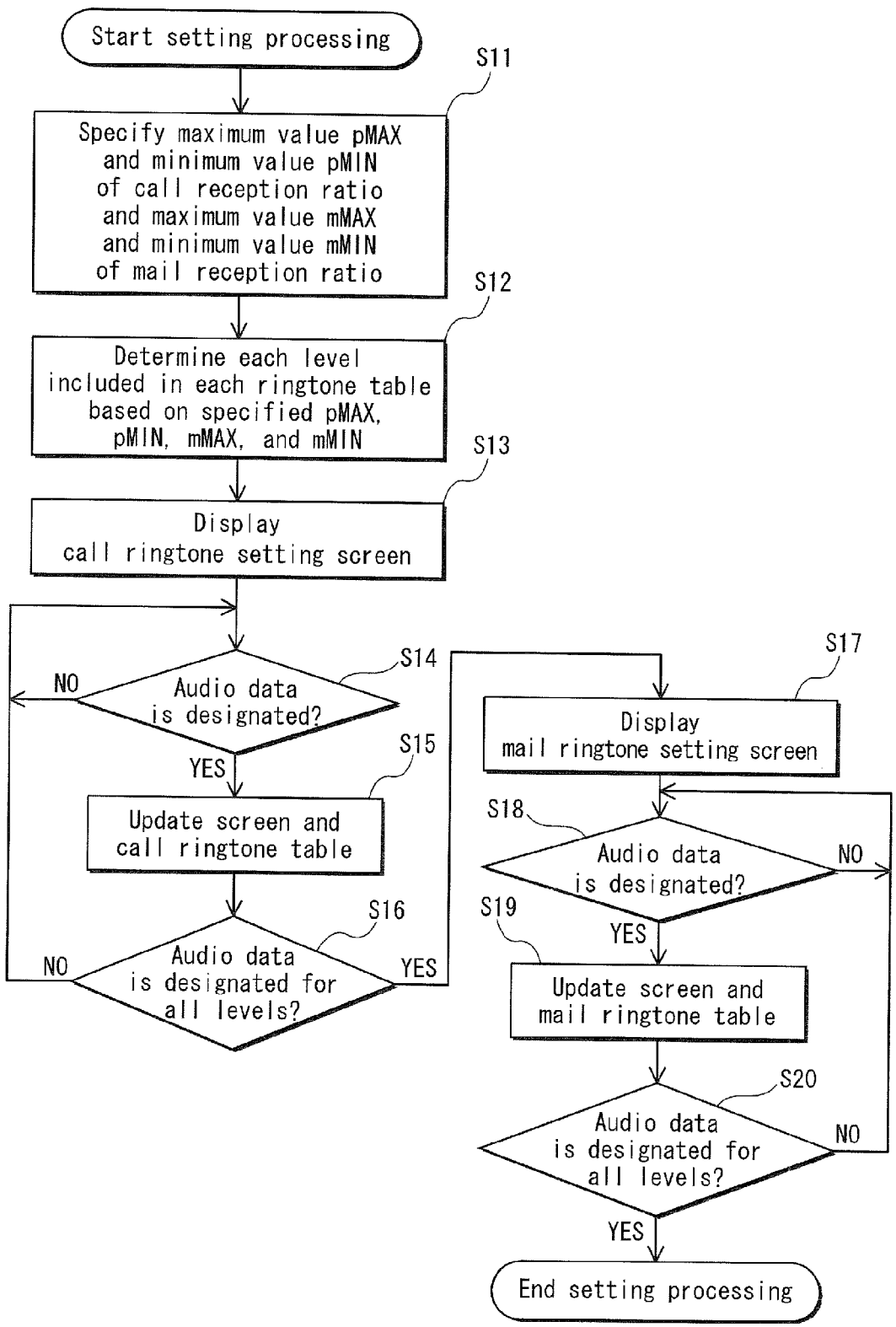
FIG. 6 is a flow chart showing setting processing performed by the control unit 150 included in the mobile phone 100.

FIG. 6 is a flow chart showing setting processing performed by the control unit 150 included in the mobile phone 100.

The setting processing shown in FIG. 6 is performed when a user performs predetermined operation on the set of keys 5.

The setting unit 151 included in the control unit 150 first specifies a maximum value pMAX and a minimum value pMIN of the call reception ratio and a maximum value mMAX and a minimum value mMIN of the mail reception ratio with reference to the frequency table 30 (step S11).

The setting unit 151 then determines each level included in the call ringtone table 60 based on the maximum value pMAX and the minimum value pMIN of the call reception ratio specified in the step S11, and determines each level included in the mail ringtone table 70 based on the maximum value mMAX and the minimum value mMIN of the mail reception ratio specified in the step S11 (step S12).

For example, when the number of audio data pieces stored in the mobile phone 100 is n (e.g. "12") and the number of audio data pieces set in each ringtone table is (n−2)/2 ("5" in this example), the number of levels included in each ringtone table is also (n−2)/2. The remaining two audio data pieces are not associated with any of the levels because these audio data pieces are used as ringtones when an incoming call or mail is received from an originator not registered with the address book 10, as described later. When the number of stored audio data pieces is an odd number, the above-mentioned number of audio data pieces set in each ringtone table may be (n−3)/2. If the number n is one in the above-mentioned calculation of the number of levels, the number of levels may be zero.

As described above, the setting unit 151 determines each level included in the call ringtone table 60 so that the maximum value pMAX and the minimum value pMIN of the call reception ratio are each included in any of the levels and a range of each level is calculated as (the maximum value pMAX of the call reception ratio—the minimum value pMIN of the call reception ratio+1)/{(n−2)/2}.

The setting unit 151 also determines each level included in the mail ringtone table 70 so that the maximum value mMAX and the minimum value mMIN of the mail reception ratio are each included in any of the levels and a range of each level is calculated as (the maximum value mMAX of the mail reception ratio—the minimum value mMIN of the mail reception ratio+1)/{(n−2)/2}.

For example, when the maximum value pMAX and the minimum value pMIN of the call reception ratio are "210" and "10", respectively, each level included in the call ringtone table 60 is determined so that a range of each level is 41(≈ (210−10+1)/5). That is to say, the levels are determined as "equal to or greater than 170% and equal to or smaller than 210%", "equal to or greater than 129% and equal to or smaller than 169%", "equal to or greater than 88% and equal to or smaller than 128%", "equal to or greater than 47% and equal to or smaller than 87%", and "equal to or greater than 6% and equal to or smaller than 46%".

Similarly, for example, when the maximum value mMAX and the minimum value mMIN of the mail reception ratio are "100" and "23", respectively, each level included in the mail ringtone table 70 is determined so that a range of each level is 16 (≈(100−23+1)/5). That is to say, the levels are determined as "equal to or greater than 85% and equal to or smaller than 100%", "equal to or greater than 69% and equal to or smaller than 84%", "equal to or greater than 53% and equal to or smaller than 68%", "equal to or greater than 37% and equal to or smaller than 52%", and "equal to or greater than 21% and equal to or smaller than 36%".

The setting unit 151 then instructs the display control unit 153 to display, on the display screen 110, a screen for enabling a user to designate audio data pieces to be associated with respective levels included in the call ringtone table 60 determined in the step S12 (hereinafter, referred to as a "call ringtone setting screen") (step S13).

FIG. 7A shows an example of the call ringtone setting screen.

For the sake of simplicity, in each of FIGS. 7A, 7B, and 7C, only an example of a screen of the mobile phone 100 is shown, and a housing of the mobile phone 100 and the like are omitted.

In a call ringtone setting screen G10 shown in FIG. 7A, a cursor K10 is positioned on a column of the audio data corresponding to a level "88 to 128". A user performs selection operation on the set of keys 5 in this state so that an audio data piece to be associated with the level "88 to 128" is designated. By a user performing movement operation on the set of keys 5 in this state, the cursor K10 is moved so that an audio data piece to be associated with another level can be designated.

FIG. 7B shows an example of a screen for enabling a user to select an audio data piece to be associated with each level (hereinafter, referred to as an "audio data selection screen") displayed by a user performing the selection operation on the set of keys 5 in the state shown in FIG. 7A.

In an audio data selection screen G20 shown in FIG. 7B, a cursor K20 is positioned on an audio data piece A. A user performs the selection operation on the set of keys 5 in this state so that the audio data piece A is selected as an audio data piece to be associated with the level "88 to 128". By a user performing the movement operation on the set of keys 5 in this state, the cursor K20 is moved so that another audio data piece (audio data pieces B to L) can be selected.

FIG. 7C shows a call ringtone setting screen G11 displayed by a user performing the selection operation on the set of keys 5 in the state shown in FIG. 7B.

FIG. 7C shows that the audio data piece A selected by the user is associated with the level "88 to 128".

By applying the operation to designate an audio data piece to be associated with one level, which is described with use of FIGS. 7A, 7B, and 7C, to other levels determined in the step S12, audio data pieces are designated for all the levels included in the call ringtone table 60.

Description on the setting processing performed by the setting unit 151 is continued with reference to FIG. 6 again.

Since the call ringtone setting screen is displayed on the display screen 110 by the processing in the step S13 (see FIG. 7A), the setting unit 151 judges whether or not an audio data piece to be associated with one level is designated (step S14).

When judging that the audio data piece is not designated (step S14: NO), the setting unit 151 performs the processing in the step S14 again. When the setting unit 151 judges that the audio data piece is designated (step S14: YES), the call ringtone setting screen having been updated so that the designated audio data piece is associated with the one level (see, for example, FIG. 7C) is displayed and the call ringtone table 60 is updated (step S15).

If the audio data piece A is designated by a user as an audio data piece to be associated with the level "88 to 128" as shown in FIGS. 7B and 7C, an audio data piece to be associated with the level "88 to 128" included in the call ringtone table 60 is updated to "A".

The setting unit 151 then judges whether or not an audio data piece is designated for all the levels included in the call ringtone table 60 determined in the step S12 (step S16). When judging that an audio data piece is not designated for all the levels (step S16: NO), the setting unit 151 performs the processing in the step S14 again.

When judging that an audio data piece is designated for all the levels (step S16: YES), the setting unit 151 performs, with respect to an incoming mail, a processing similar to the processing performed with respect to an incoming call in the steps S13 to S16 (steps S17 to S20).

This means that the setting unit 151 instructs the display control unit 153 to display, on the display screen 110, a screen for enabling a user to designate audio data pieces to be associated with respective levels included in the mail ringtone table 70 determined in the step S12 (hereinafter, referred to as a "mail ringtone setting screen") (step S17). Although not illustrated and described in detail, the mail ringtone setting screen is similar to the call ringtone setting screen G10 shown in FIG. 7A but differs from the call ringtone setting screen G10 in a range of each level. In this example, levels "85 to 100", "69 to 84", "53 to 68", "37 to 52", and "21 to 36" are displayed in this order in columns of the level included in the mail ringtone setting screen.

The setting unit 151 judges whether or not an audio data piece to be associated with one level is designated (step S18). When judging that the audio data piece is not designated (step S18: NO), the setting unit 151 performs the processing in the step S18 again. When the setting unit 151 judges that the audio data piece is designated (step S18: YES), the mail ringtone setting screen having been updated so that the designated audio data piece is associated with the one level is displayed and the mail ringtone table 70 is updated (step S19).

The setting unit 151 then judges whether or not an audio data piece is designated for all the levels included in the mail ringtone table 70 determined in the step S12 (step S20). When judging that an audio data piece is not designated for all the levels (step S20: NO), the setting unit 151 performs the processing in the step S18 again. When judging that an audio data piece is designated for all the levels (step S20: YES), the setting unit 151 ends the setting processing.

<5-3. Communication Reception Processing>

Communication reception processing is described next.

Figure 8:
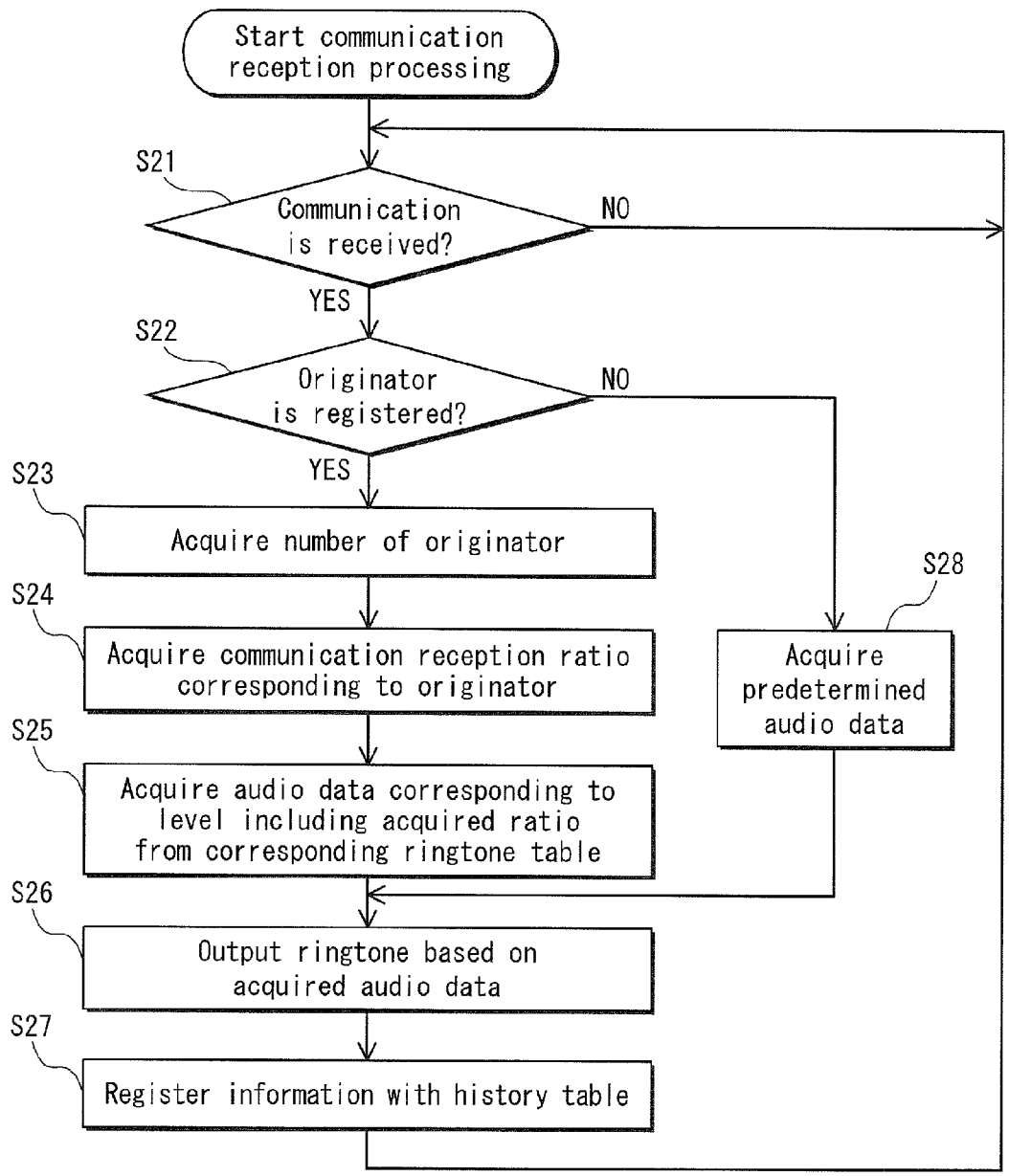
FIG. 8 is a flow chart showing communication reception processing performed by the control unit 150 included in the mobile phone 100.

FIG. 8 is a flow chart showing communication reception processing performed by the control unit 150 included in the mobile phone 100.

The communication reception processing shown in FIG. 8 is started when the mobile phone 100 is turned on, and is ended when the mobile phone 100 is turned off although not specifically shown.

First, the control unit 150 judges whether an incoming call or mail is received based on whether a signal indicating an incoming call or a signal indicating an incoming mail is received from a base station via the communication unit 120 (step S21). Assume that the signal indicating an incoming call includes a phone number of an originator of the incoming call, and the signal indicating an incoming mail includes a mail address of an originator (sender) of the incoming mail.

When neither of the signals is received from a base station via the communication unit 120, the control unit 150 judges that no incoming communication is received (step S21: NO) and performs the processing in the step S21 again.

When either of the signals is received from a base station via the communication unit 120, the control unit 150 judges that an incoming communication is received (step S21: YES) and acquires a current date and time from the timing unit 131.

The output control unit 154 included in the control unit 150 judges whether or not information indicating an originator of the incoming communication, i.e., a phone number included in the signal indicating an incoming call or a mail address included in the signal indicating an incoming mail received in the step S21, is registered with the address book 10 (step S22).

When the information indicating the originator is registered with the address book 10 (step S22: YES), the output control unit 154 acquires a number registered in correspondence with the information indicating the originator from the address book 10 (step S23) and acquires, from the frequency table 30, the communication reception ratio registered in correspondence with the acquired number (step S24). The acquired communication reception ratio is the call reception ratio when the incoming communication is judged to be an incoming call in the step S21, and is the mail reception ratio when the incoming communication is judged to be an incoming mail in the step S21.

The output control unit 154 acquires an audio data piece corresponding to a level including the communication reception ratio acquired in the step S24 from the call ringtone table 60 when the acquired communication reception ratio is the call reception ratio, and from the mail ringtone table 70 when the acquired communication reception ratio is the mail reception ratio (step S25).

The output control unit 154 outputs a ringtone from the speaker 3 via the audio processing unit 130 based on the acquired audio data piece (step S26).

The control unit 150 registers the current date and time acquired in the step S21 and the information indicating the originator in correspondence with each other, with the call history table 40 when the incoming communication is judged to be an incoming call in the step S21, and with the mail history table 50 when the incoming communication is judged to be an incoming mail in the step S21 (step S27).

Upon completion of the registration with the call history table 40 or the mail history table 50, the control unit 150 performs the processing in the step S21 again.

On the other hand, when the information indicating the originator is not registered with the address book 10 in the step S22 (step S22: NO), the output control unit 154 acquires a predetermined audio data piece, i.e. an audio data piece that is stored in the mobile phone 100 and is not associated with any of the levels included in each ringtone table (step S28), and proceeds to the processing in the step S26.

In the ringtone tables shown in FIGS. 4C and 4D, since audio data pieces K and L, from among audio data pieces A to L shown in FIG. 7B, are not associated with any of the levels, the output control unit 154 acquires the audio data piece K when the incoming communication is judged to be an incoming call in the step S21, and acquires the audio data piece L when the incoming communication is judged to be an incoming mail in the step S21, for example.

<<Modification>>

In the embodiment, an example of the mobile phone 100 that distinguishes an incoming call and an incoming mail from each other is described. Described in the following modification is a mobile phone that does not distinguish an incoming call and an incoming mail from each other, and in particular differences from the mobile phone 100 in the embodiment.

<1. Functional Structure>

Figure 9:
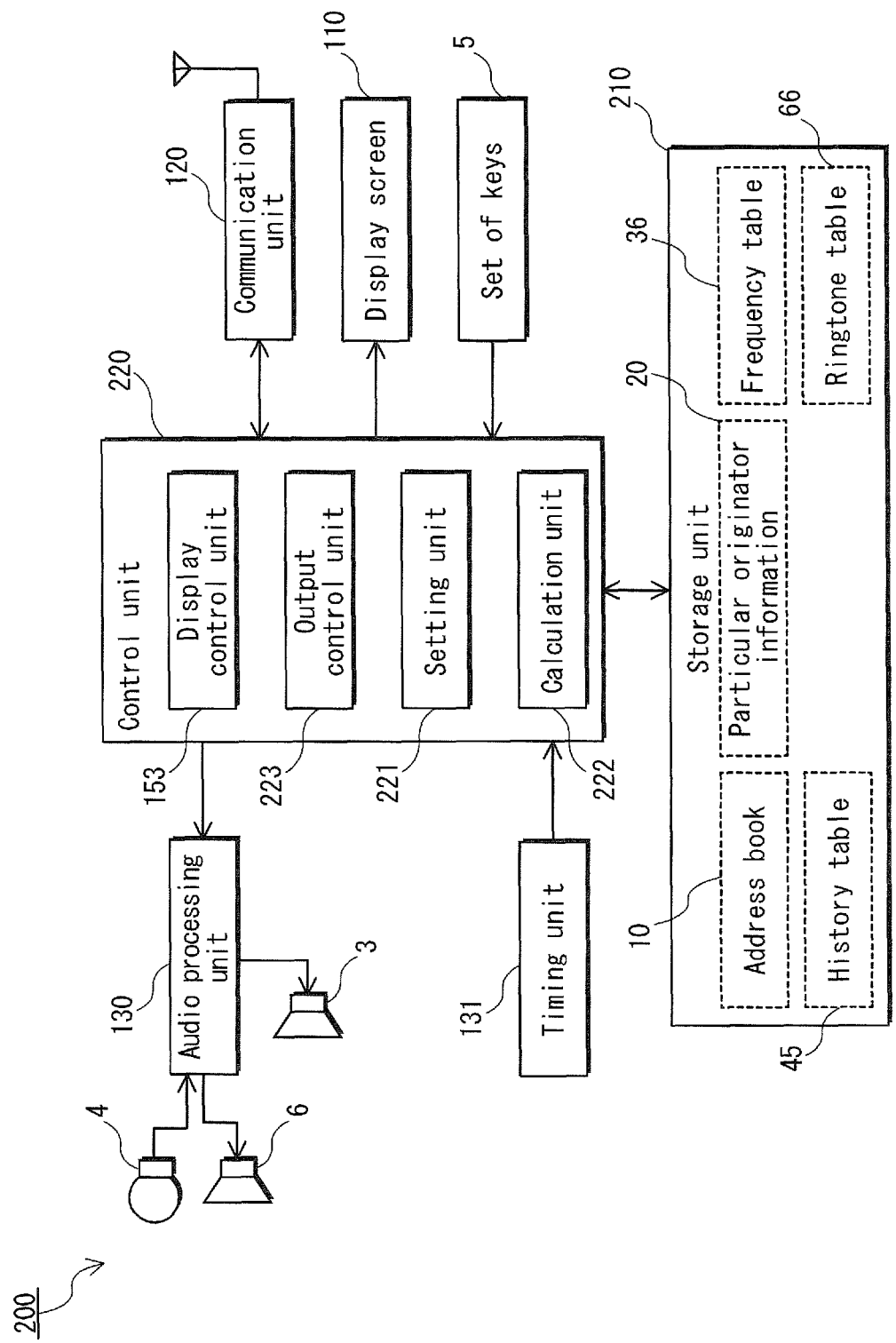
FIG. 9 is a block diagram showing the functional structure of main components of a mobile phone 200 in a modification.

FIG. 9 is a block diagram showing the functional structure of main components of a mobile phone 200 in the modification.

As shown in FIG. 9, the mobile phone 200 includes a storage unit 210 and a control unit 220 in place of the storage unit 140 and the control unit 150 included in the mobile phone 100.

The storage unit 210 is a memory area for storing therein the address book 10, the particular originator information 20, a frequency table 36, a history table 45, and a ringtone table 66. The storage unit 210 differs from the storage unit 140 included in the mobile phone 100 in that it includes a memory area for storing therein the frequency table 36 in place of the frequency table 30, the history table 45 in place of the call history table 40 and the mail history table 50, and the ringtone table 66 in place of the call ringtone table 60 and the mail ringtone table 70.

The control unit 220 differs from the control unit 150 in that it includes a setting unit 221, a calculation unit 222, and an output control unit 223 in place of the setting unit 151, the calculation unit 152, and the output control unit 154 of the control unit 150 included in the mobile phone 100. These components are described in detail later (see FIGS. 11, 12, and 13).

<2. Data>

The following describes data pieces used by the mobile phone 200 with use of FIGS. 10A, 10B, and 10C.

<2-1. Frequency Table 36>

FIG. 10A shows the data structure and an example of the frequency table 36.

As shown in FIG. 10A, the frequency table 36 includes communication reception frequency 37 in place of the call reception frequency 32 and the mail reception frequency 33 included in the frequency table 30 in the embodiment, and includes a communication reception ratio 38 in place of the call reception ratio 34 and the mail reception ratio 35 included in the frequency table 30 in the embodiment.

The number 31 is similar to the number 31 included in the frequency table 30 in the embodiment. The communication reception frequency 37 is information indicating the number of at least incoming calls or incoming mails received from a communication partner identified by a corresponding number during a given time period.

The communication reception ratio 38 is information indicating a ratio (%) of the number of at least received incoming calls or received incoming mails indicated by the communication reception frequency for a corresponding originator to the number of at least received incoming calls or received incoming mails indicated by the communication reception frequency for a particular originator indicated by the particular originator information 20. The communication reception ratio 38 is therefore information indicating the relative communication reception frequency for each communication partner.

FIG. 10A shows, for example, that the communication reception frequency and the communication reception ratio for a communication partner whose number is "2" (i.e. Person B) with respect to an incoming call and an incoming mail are "6" and "19 (≈6/32×100)", respectively.

<2-2. History Table 45>

FIG. 10B shows the data structure and an example of the history table 45.

As shown in FIG. 10B, the history table 45 is information including a reception date and time 41, and an originator 46.

Hereinafter, information for one call/mail including a reception date and time, and an originator registered in correspondence with each other (i.e. a record) is also referred to as a "history".

The reception date and time 41 is similar to the reception date and time 41 included in the call history table 40 in the embodiment, and is information indicating a reception date and time when an incoming call or an incoming mail has been received. The originator 46 is information indicating an originator who has made an incoming call at a corresponding date and time or an originator who has sent an incoming mail at a corresponding date and time. As the originator 46, a phone number is registered when an incoming call is received, and a mail address is registered when an incoming mail is received.

FIG. 10B shows, for example, that an originator of an incoming communication whose reception date and time is "2011/8/1 8:50" is "a*a@bbb.com" (i.e. the incoming communication is an incoming mail, and an originator of the incoming mail is Person A).

FIG. 10B also shows, for example, that an originator of an incoming communication whose reception date and time is "2011/8/1 9:01" is "090****1111" (i.e. the incoming communication is an incoming call, and an originator of the incoming call is Person A).

<2-3. Ringtone Table 66>

FIG. 10C shows the data structure and an example of the ringtone table 66.

As shown in FIG. 10C, the ringtone table 66 is information including a level 67 and audio data 68.

The level 67 is information indicating levels of the relative communication reception frequency. The audio data 68 is information indicating audio data pieces each output as a ringtone when the relative communication reception frequency for an originator is within a range indicated by a corresponding level.

FIG. 10C shows, for example, that a ringtone is output based on an audio data piece "A" when a level is "equal to or greater than 84% and equal to or smaller than 100%".

<3. Operation>

<3-1. Calculation Processing>

Calculation processing is described first.

Figure 11:
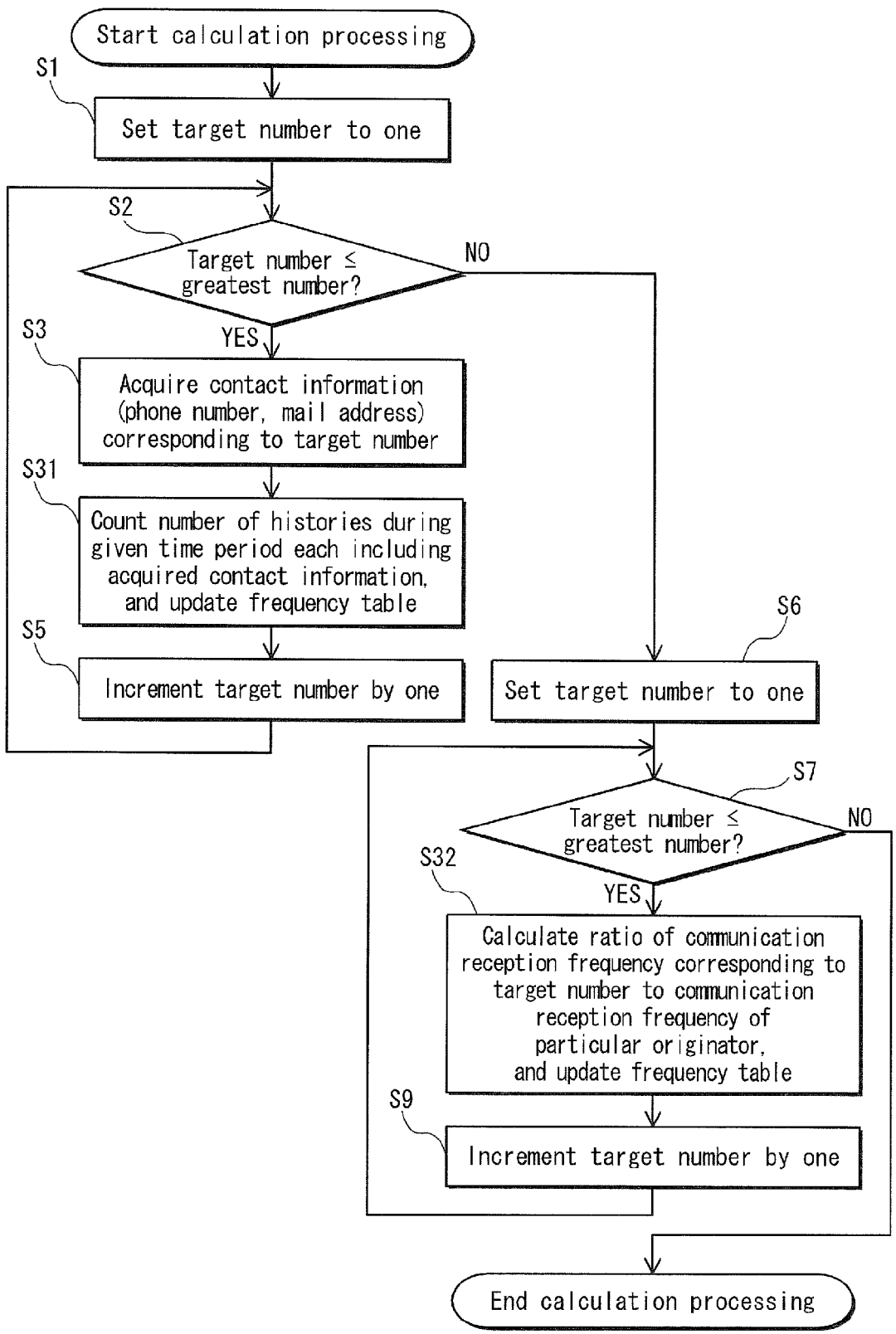
FIG. 11 is a flow chart showing calculation processing performed by a control unit 220 included in the mobile phone 200.

FIG. 11 is a flow chart showing calculation processing performed by the control unit 220 included in the mobile phone 200.

The calculation processing shown in FIG. 11 is obtained by making a slight modification to the processing in the steps S4 and S8 in the calculation processing performed by the control unit 150 in the embodiment (see FIG. 5). The modification has been made because the mobile phone 200 stores therein the frequency table 36 in place of the frequency table 30, and the history table 45 in place of the call history table 40 and the mail history table 50, as described above.

The calculation unit 222 included in the control unit 220 initializes the target number after acquiring a current date and time (step S1), and judges whether or not the target number is equal to or smaller than the greatest number of all the numbers registered with the address book 10 (step S2).

When judging that the target number is equal to or smaller than the greatest number (step S2: YES), the calculation unit 222 acquires a phone number and a mail address corresponding to the target number (step S3).

The calculation unit 222 then counts the number of records including the phone number or the mail address acquired in the step S3 in the originator and including a reception date and time during a time period from a given time point in the past to the present indicated by the acquired current date and time, i.e. the number of histories, with reference to the history table 45. The calculation unit 222 updates the communication reception frequency corresponding to the target number in the frequency table 36 to the counted number of histories (step S31).

After completing the processing in the step S31, the calculation unit 222 updates the target number (step S5), and performs the processing in the step S2 again. When the target number is judged to be greater than the greatest number (step S2: NO), the target number is initialized (step S6). The calculation unit 222 judges whether or not the target number is equal to or smaller than the greatest number of all the numbers registered with the address book 10 again (step S7).

When judging that the target number is equal to or smaller than the greatest number (step S7: YES), the calculation unit 222 calculates a communication reception ratio Rt, which is registered with the frequency table 36, of communication reception frequency Ft of an originator identified by the target number, to communication reception frequency Fs of a particular originator indicated by the particular originator information 20 as follows: Rt=Ft/Fs×100. The calculation unit 222 updates the communication reception ratio corresponding to the target number in the frequency table 36 to the calculated communication reception ratio Rt (step S32).

After completing the processing in the step S32, the calculation unit 222 updates the target number (step S9), and performs the processing in the step S7 again. When judging that the target number is greater than the greatest number (step S7: NO), the calculation unit 222 ends the calculation processing.

<3-2. Setting Processing>

Setting processing is described next.

Figure 12:
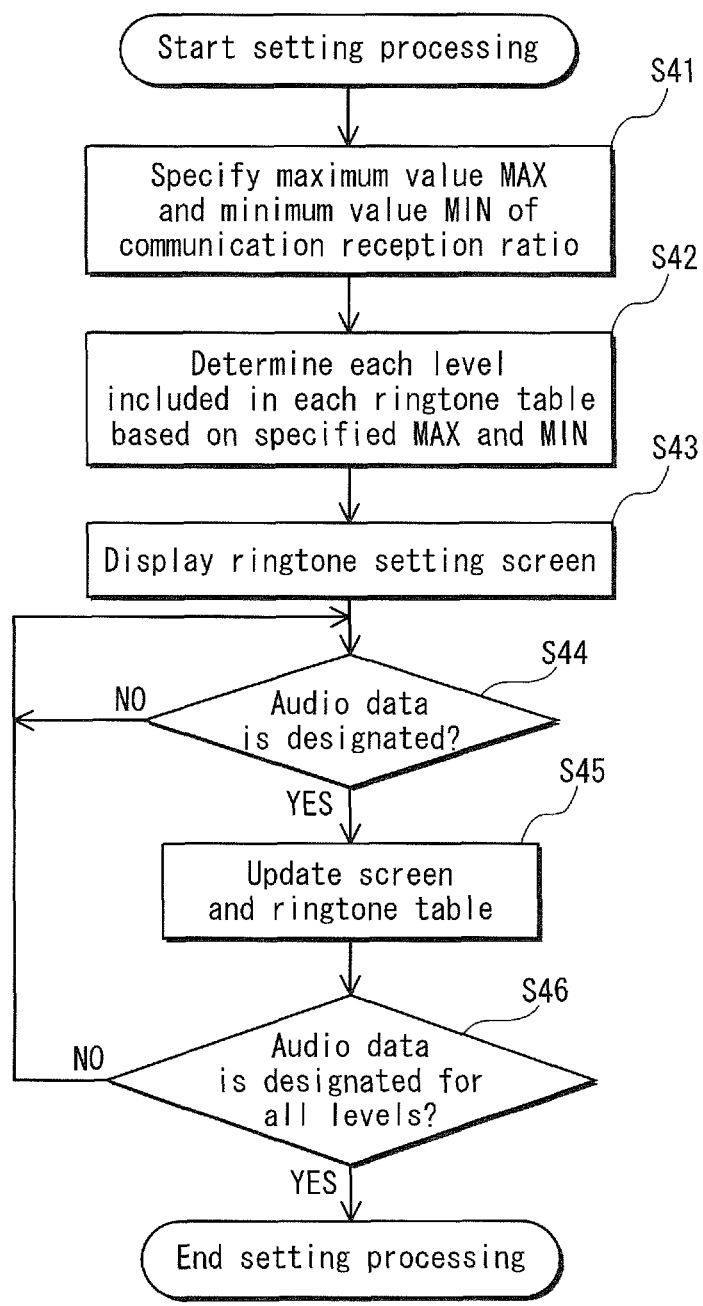
FIG. 12 is a flow chart showing setting processing performed by the control unit 220 included in the mobile phone 200.

FIG. 12 is a flow chart showing setting processing performed by the control unit 220 included in the mobile phone 200.

The setting processing shown in FIG. 12 is obtained by making a slight modification to the setting processing performed by the control unit 150 in the embodiment (see FIG. 6). The modification has been made because the mobile phone 200 stores therein the frequency table 36 in place of the frequency table 30, and the ringtone table 66 in place of the call ringtone table 60 and the mail ringtone table 70, as described above.

The setting unit 221 included in the control unit 220 specifies a maximum value MAX and a minimum value MIN of the communication reception ratio with reference to the frequency table 36 (step S41), and determines each level included in the ringtone table 66 based on the specified maximum value MAX and minimum value MIN of the communication reception ratio (step S42).

Described in the present modification is a case where five out of twelve audio data pieces stored in the mobile phone 200 are used, i.e. the number of levels included in the ringtone table 66 is five. As described in the embodiment, however, n−1 out of n audio data pieces may be used so that one audio data piece can be used when an incoming communication is received from an originator not registered with the address book 10. That is to say, the number of levels included in the ringtone table 66 may be n−1.

In the processing in the step S42, each level included in the ringtone table 66 is determined so that the maximum value MAX and the minimum value MIN of the communication reception ratio are each included in any of the levels and a range of each level is calculated as (the maximum value MAX of the communication reception ratio−the minimum value MIN of the communication reception ratio+1)/5.

For example, when the maximum value MAX and the minimum value MIN of the communication reception ratio are "100" and "19", respectively, each level included in the ringtone table 66 is determined so that a range of each level is 17 (≈(100−19+1)/5). That is to say, the levels are determined as "equal to or greater than 84% and equal to or smaller than 100%", "equal to or greater than 67% and equal to or smaller than 83%", "equal to or greater than 50% and equal to or smaller than 66%", "equal to or greater than 33% and equal to or smaller than 49%", and "equal to or greater than 16% and equal to or smaller than 32%".

The setting unit 221 then instructs the display control unit 153 to display, on the display screen 110, a screen for enabling a user to designate audio data pieces to be associated with respective levels included in the ringtone table 66 determined in the step S42 (hereinafter, referred to as a "ringtone setting screen") (step S43). Although not illustrated and described in detail, the ringtone setting screen is similar to the call ringtone setting screen G10 shown in FIG. 7A but differs from the call ringtone setting screen G10 in a range of each level. In this example, levels "84 to 100", "67 to 83", "50 to 66", "33 to 49", and "16 to 32" are displayed in this order in columns of the level included in the ringtone setting screen.

The setting unit 221 then judges whether or not an audio data piece to be associated with one level is designated (step S44). When judging that the audio data piece is not designated (step S44: NO), the setting unit 221 performs the processing in the step S44 again.

When the setting unit 221 judges that the audio data piece is designated (step S44: YES), the ringtone setting screen having been updated so that the designated audio data piece is associated with the one level is displayed and the ringtone table 66 is updated (step S45).

If the audio data piece D is designated by a user as an audio data piece to be associated with the level "50 to 66", an audio data piece to be associated with the level "50 to 66" included in the ringtone table 66 is updated to "D".

The setting unit 221 judges whether or not an audio data piece is designated for all the levels included in the ringtone table 66 determined in the step S42 (step S46). When judging that an audio data piece is not designated for all the levels (step S46: NO), the setting unit 221 performs the processing in the step S44 again.

When judging that an audio data piece is designated for all the levels (step S46: YES), the setting unit 221 ends the setting processing.

<3-3. Communication Reception Processing>

Communication reception processing is described next.

Figure 13:
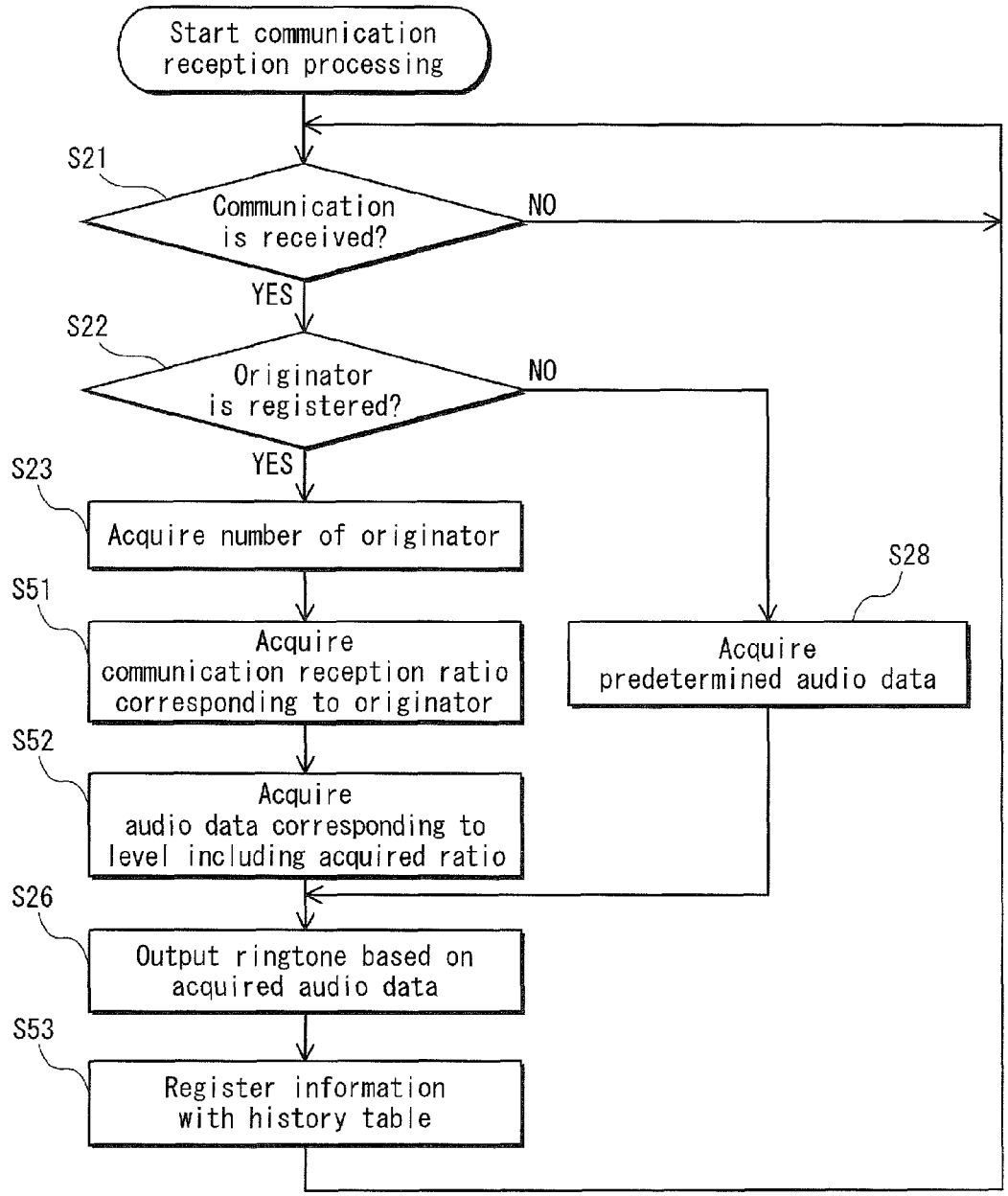
FIG. 13 is a flow chart showing communication reception processing performed by the control unit 220 included in the mobile phone 200.

FIG. 13 is a flow chart showing communication reception processing performed by the control unit 220 included in the mobile phone 200.

The communication reception processing shown in FIG. 13 is obtained by making a slight modification to the processing in the steps S24, S25, and S27 in the communication reception processing performed by the control unit 150 in the embodiment (see FIG. 8). The modification has been made because the mobile phone 200 stores therein the frequency table 36 in place of the frequency table 30, the history table 45 in place of the call history table 40 and the mail history table 50, and the ringtone table 66 in place of the call ringtone table 60 and the mail ringtone table 70, as described above.

The control unit 220 judges whether an incoming call or mail is received (step S21). When judging that an incoming communication is received (step S21: YES), the control unit 220 acquires a current date and time from the timing unit 131.

The output control unit 223 included in the control unit 220 judges whether or not information indicating an originator of the incoming communication is registered with the address book 10 (step S22). When judging that the information indicating the originator is registered (step S22: YES), the output control unit 223 acquires a number registered in correspondence with the information indicating the originator (step S23).

The output control unit 223 also acquires the communication reception ratio registered in correspondence with the acquired number from the frequency table 36 (step S51), and acquires an audio data piece associated with a level including the acquired communication reception ratio from the ringtone table 66 (step S52).

The output control unit 223 outputs a ringtone based on the acquired audio data piece (step S26). The control unit 220 registers the current date and time acquired in the step S21 and the information indicating the originator in correspondence with each other with the history table 45 (step S53), and performs the processing in the step S21 again.

On the other hand, when the information indicating the originator is not registered with the address book 10 in the step S22 (step S22: NO), the output control unit 223 acquires a predetermined audio data piece (step S28), and proceeds to the processing in the step S26.

In the ringtone table 66 shown in FIG. 10C, since audio data pieces F to L, from among audio data pieces A to L stored in the mobile phone 200, are not associated with any of the levels, the output control unit 223 acquires the audio data piece F, for example.

<<Supplemental Note>>

Although the mobile phone of the present invention has been described based on the above-mentioned embodiment and modification, the following modifications also fall within a scope of the present invention. It is obvious that the present invention is not limited to the mobile phone as described in the above-mentioned embodiment and modification.

(1) In the level 67 included in the ringtone table 66 in the modification, an upper limit ("100" in FIG. 10C) and a lower limit ("16" in FIG. 10C) of the relative communication reception frequency are set. However, at least one of the upper limit and the lower limit may not be set. A ringtone table 80 shown in FIG. 14A is an example of the ringtone table in which the upper limit and the lower limit are not set. In the ringtone table 80, the highest level is "equal to or greater than 121%" (see a reference sign 81) and the lowest level is "equal to or smaller than 40%" (see a reference sign 82).

In the ringtone table 66 in the modification, the levels are even divisions of a range of values of the relative communication reception frequency. The levels, however, may not be even divisions as long as one level does not overlap another level.

As shown in a level "81 to 120" (see a reference sign 83) and a level "61 to 80" (see a reference sign 84) included in the ringtone table 80 of FIG. 14A, the levels may include a level that includes a different number of values of the relative communication reception frequency from another level.

As shown in a level "100" (see a reference sign 86) included in a ringtone table 85 of FIG. 14B, the levels may include a level that includes only one value of the relative communication reception frequency. With this configuration, a particular ringtone to be output when an incoming communication is received from a particular originator is less likely to be output when an incoming communication is received from another originator. Therefore, the possibility that a user can identify a particular originator from a ringtone increases.

In the modification, each level included in the ringtone table 66 is determined based on the maximum value MAX and the minimum value MIN of the communication reception ratio. Each level, however, may be fixed.

As a level of the relative communication reception frequency, a level "equal to or smaller than 50%", a level "equal to or greater than 200%", or the like is generally easily recognized by a user.

As shown in the ringtone table 85 of FIG. 14B, values of the levels may be fixed to, for example, "equal to or greater than 200%", "equal to or greater than 101% and equal to or smaller than 199%", "100%", "equal to or greater than 51% and equal to or smaller than 99%", and "equal to or smaller than 50%".

This configuration makes it easy for a user to know whether the relative communication reception frequency for an originator is "equal to or smaller than 50%" or "equal to or greater than 200%" from an output ringtone.

Although a case where the ringtone table 66 in the modification is further modified is described here, the modification in this section (1) is applicable to the call ringtone table 60 and the mail ringtone table 70 in the embodiment.

In the embodiment, the number of levels included in the ringtone table 60 or 70 ((n−2)/2 in the embodiment) is determined based on the number of audio data pieces stored in the mobile phone 100. However, a user may designate the number of levels within the number of audio data pieces stored in the mobile phone 100.

(2) The setting processing in the embodiment and the modification is started when a user performs predetermined operation on the set of keys 5. The setting processing, however, may be started when a given time period elapses after a user first starts using the mobile phone 100 in the embodiment or the mobile phone 200 in the modification. Alternatively, a screen for enabling a user to choose whether or not to set audio data pieces may be displayed when a given time period elapses after a user first starts using each mobile phone, and the setting processing may be started if the user chooses to set the audio data pieces.

The setting processing may be started automatically or according to an instruction from a user to set the audio data pieces when the maximum value pMAX or the minimum value pMIN of the call reception ratio is no longer included in any of the levels included in the call ringtone table 60, or the maximum value mMAX or the minimum value mMIN of the mail reception ratio is no longer included in any of the levels included in the mail ringtone table 70, in a case where the mobile phone 100 in the embodiment performs the calculation processing. Similarly, the setting processing may be started automatically or according to an instruction from a user to set the audio data pieces when the maximum value MAX or the minimum value MIN of the communication reception ratio is no longer included in any of the levels included in the ringtone table 66, in a case where the mobile phone 200 in the modification performs the calculation processing.

(3) In the communication reception processing in the embodiment and the modification, when an incoming communication is received from an originator not registered with the address book 10, a predetermined audio data piece is acquired and a ringtone is output based on the acquired audio data piece (the steps S28 and S26 shown in each of FIGS. 8 and 13).

Even when an incoming communication is received from the originator not registered with the address book 10, however, an audio data piece may be determined according to the relative communication reception frequency for the originator, and a ringtone may be output based on the determined audio data piece.

To this end, each of the ringtone tables 60 and 70 in the embodiment and the ringtone table 66 in the modification is modified so that the levels include the relative communication reception frequency "1/F×100", which indicates a ratio of the communication reception frequency for an originator to the communication reception frequency F of a particular originator. When an incoming communication is received from the originator not registered with the address book 10, the communication reception frequency for the originator is assumed to be "1", and a ringtone is output based on an audio data piece that is registered, with the ringtone table in this modification, in correspondence with a level including the relative communication reception frequency "1/F×100" of the originator.

In the communication reception processing in the embodiment and the modification, when an incoming communication is received from the originator not registered with the address book 10, a ringtone is output based on one audio data piece selected by the mobile phone 100 in the embodiment or the mobile phone 200 in the modification. The ringtone, however, may be output based on an audio data piece selected by a user.

(4) In the modification, the communication reception ratio 38 is calculated and registered in advance for each communication partner as shown in the frequency table 36 of FIG. 10A. The frequency table 36, however, may be modified so that information indicating levels, included in the ringtone table 66, including the communication reception ratio are registered in place of the communication reception ratio 38 or in addition to the communication reception ratio 38.

This modification is also applicable to the frequency table 30 in the embodiment. That is to say, the frequency table 30 may be modified so that information indicating levels, included in the call ringtone table 60, including the call reception ratio included in the frequency table 30 and information indicating levels, included in the mail ringtone table 70, including the mail reception ratio included in the frequency table 30 are registered.

(5) In the setting processing in the embodiment and the modification, an audio data piece is designated by a user for all the levels, as shown in the steps S16 and S20 of FIG. 6 and in the step S46 of FIG. 12.

Each of the mobile phone 100 in the embodiment the mobile phone 200 in the modification may be modified so that one or more of all the levels are determined automatically. For example, each mobile phone may be modified so that only a ringtone for a particular originator, i.e. an audio data piece to be associated with a level including a level "100%" of the relative communication reception frequency, is designated by a user.

(6) Described in the embodiment is an example in which a particular originator with respect to an incoming call and a particular originator with respect to an incoming mail are the same. They, however, may be different.

Although a particular originator is designated by a user in the embodiment and the modification, a particular originator may be automatically selected by each of the mobile phone 100 in the embodiment and the mobile phone 200 in the modification. For example, an originator having the highest composite or average value of the call reception frequency and the mail reception frequency may be selected as a particular originator in the embodiment, and an originator having the highest communication reception frequency may be selected as a particular originator in the modification. Alternatively, in the embodiment, information (e.g. name) indicating one or more originators each having a composite or average value of the call reception frequency and the mail reception frequency higher than a predetermined value may be displayed as information indicating one or more candidate particular originators to enable a user to select one originator from among the candidate particular originators as a particular originator. In the modification, information (e.g. name) indicating one or more originators each having the communication reception frequency higher than a predetermined value may be displayed as information indicating one or more candidate particular originators to enable a user to select one originator from among the candidate particular originators as a particular originator.

Described in the embodiment and the modification is an example in which a certain communication partner is designated as a particular originator. However, communication partners may be classified into a plurality of groups and registered with the address book 10, and one of the plurality of groups may be treated as a particular originator.

In this case, the communication reception frequency for each group is calculated based on the communication reception frequency (the call reception frequency and the mail reception frequency in the embodiment) of each communication partner belonging to the group. A composite or average value of the communication reception frequency for communication partners belonging to each group may be used to calculate the communication reception frequency for the group.

A ringtone may be output based on an audio data piece corresponding to the relative communication reception frequency for an originator. The relative communication reception frequency here indicates a ratio of the communication reception frequency for a group to which the originator belongs to the communication reception frequency for a particular originator (one group).

(7) In the embodiment and the modification, the communication reception frequency (the call reception frequency and the mail reception frequency in the embodiment) indicates the number of received incoming communications during a given time period. However, the communication reception frequency may indicate an average value of the number of received incoming communications for each day constituting the given time period.

In the embodiment and the modification, the communication reception frequency (the call reception frequency and the mail reception frequency in the embodiment) is counted and registered with each of the frequency tables 30 and 36 in advance. However, when an incoming communication is received, the communication reception frequency for an originator of the incoming communication and the communication reception frequency for a particular originator during a time period from a given time point in the past to a time point when the incoming communication is received may be counted, and the relative communication reception frequency for the originator may be calculated.

With this configuration, since a ringtone is output according to the relative communication reception frequency for the originator during the time period from a given time point in the past to the time point when the incoming communication is received, a user can know the communication reception frequency for the originator in the immediate past from the ringtone.

(8) Although having been described as clamshell mobile phones, the mobile phone 100 in the embodiment and the mobile phone 200 in the modification may be mobile phones having another appearance such as sliding-type mobile phones and bar-type mobile phones.

The display screen 110 included in each of the mobile phone 100 in the embodiment and the mobile phone 200 in the modification may be a so-called touch panel. In this case, the mobile phone may be modified so as not to include the set of keys 5, and the functions of the set of keys 5 may be performed by software keys displayed on the touch panel.

Although having been described to be substantially rectangular, the display screen 110 included in each of the mobile phone 100 in the embodiment and the mobile phone 200 in the modification may be circular or polygonal. Furthermore, although having been described to include an LCD, the display screen 110 may include an organic EL (Electro-Luminescence) and the like in place of the LCD.

Although the second housing 2 is equipped with the speaker 3 in each of the mobile phone 100 in the embodiment and the mobile phone 200 in the modification, the position of the speaker 3 is not particularly limited. The first housing 1 may be equipped with the speaker 3.

(9) Some or all of the components described in the embodiment and the modification may be realized by a single integrated circuit chip, a plurality of integrated circuit chips, a computer program and in any other forms.

Each of the components described in the embodiment and the modification achieves its functions by operating in conjunction with a processor included in each of the mobile phones 100 and 200.

(10) A program for causing a processor to execute the processing (see FIGS. 5, 6, 8, 11, 12, and 13) performed by each of the control unit 150 included in the mobile phone 100 in the embodiment and the control unit 220 included in the mobile phone 200 in the modification may be distributed by being recorded on a recording medium or via various types of a communication channel. The recording medium includes an IC card, a hard disk, an optical disk, a flexible disk, ROM, and flash memory. The distributed program is provided for use by being stored in memory or the like that is readable by a processor included in a device. Each function of the mobile phone 100 in the embodiment and the mobile phone 200 in the modification is achieved by the processor executing the program.

(11) Some or all of the above-mentioned modifications (1) to (10) may be combined with one another and applied to the mobile phone 100 in the embodiment and the mobile phone 200 in the modification.

(12) The following describes the structure, modifications, and effects of the mobile phone as one aspect of the present invention.

(a) One aspect of the present invention is a mobile phone comprising: a speaker; an audio data storage unit configured to store therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator; and an output control unit configured to, when an incoming communication is received, specify, from among the levels, a level of the relative communication reception frequency for an originator of the received incoming communication, and output a ringtone from the speaker based on one of the audio data pieces corresponding to the specified level.

When an incoming communication is received, the mobile phone outputs a ringtone according to the relative communication reception frequency for an originator of the incoming communication, which indicates a ratio of the communication reception frequency for the originator to the communication reception frequency for the particular originator. When a user knows the communication reception frequency for a given originator to some extent, by setting the given originator as a particular originator, the user can recognize the relative communication reception frequency for an originator from a ringtone through comparison between the ringtone and a ringtone for the particular originator. That is to say, a user can easily know the communication reception frequency for an originator from a ringtone.

Since the relative communication reception frequency for a particular originator, which indicates a ratio of the communication reception frequency for the particular originator to the communication reception frequency for the particular originator, is constant and does not change, a predetermined ringtone is output when an originator is the particular originator. Therefore, the possibility that a user can identify the particular originator from a ringtone increases.

(b) The above-mentioned mobile phone may further comprise a setting unit configured to receive from a user, for each of the levels, designation of a different one of the audio data pieces to be associated therewith, and associate the designated audio data piece with the level.

Since the mobile phone associates a different one of the audio data pieces designated by the user with each of the levels of the relative communication reception frequency, the user can know an incoming communication from a ringtone that he/she likes.

(c) The levels may be approximately even divisions of a range of values of the relative communication reception frequency.

In the mobile phone, since the levels are approximately even divisions of a range of values of the relative communication reception frequency, a user can easily know the communication reception frequency for an originator based on a ringtone.

(d) The levels may include a level of the relative communication reception frequency that corresponds to the frequency of receiving incoming communications from the particular originator.

In the mobile phone, since the levels include the level of the relative communication reception frequency that corresponds to the communication reception frequency for the particular originator, the possibility that a ringtone is output based on an audio data piece corresponding to the level when an incoming communication is received from an originator other than the particular originator is decreased. Therefore, the possibility that a user can identify, from the ringtone, an incoming communication from the particular originator increases.

(e) The levels may include a level of the relative communication reception frequency that corresponds to less than half of the frequency of receiving incoming communications from the particular originator.

As a level of the relative communication reception frequency, a level "smaller than 50%" is generally easily recognized by a user.

In the mobile phone, since the levels include the level of the relative communication reception frequency that corresponds to less than half of the communication reception frequency for the particular originator, when an incoming communication is received from an originator whose relative communication reception frequency is less than half of the communication reception frequency for the particular originator, a user can easily know the communication reception frequency for the originator from a ringtone.

(f) The above-mentioned mobile phone may further comprise: a history storage unit configured to store therein a history of receiving incoming communications at least during a time period from a given time point in the past to the present; a frequency storage unit configured to store therein frequency information indicating frequency of receiving incoming communications from each of the originators; and a calculation unit configured to, at regular time intervals, calculate frequency of receiving incoming communications from each of the originators during the time period from the given time point in the past to the present based on the history stored in the history storage unit, and store the calculated frequency in the frequency storage unit as the frequency information.

Since the mobile phone stores therein the frequency information indicating the communication reception frequency for each originator calculated based on the history during the time period from a given time point in the past to the present, when an incoming communication is received, a ringtone can be output according to the relative communication reception frequency for an originator of the incoming communication during the time period from a given time point in the past to the present. Therefore, a user can know the relative communication reception frequency for the originator during the time period from a given time point in the past to the present from the ringtone.

(g) Each incoming communication may be an incoming mail or call, the levels of the relative communication reception frequency may include two or more levels of relative mail reception frequency and two or more levels of relative call reception frequency, the relative mail reception frequency being calculated for each of the originators and indicating a ratio of frequency of receiving incoming mails from the originator to frequency of receiving incoming mails from the particular originator, the relative call reception frequency being calculated for each of the originators and indicating a ratio of frequency of receiving incoming calls from the originator to frequency of receiving incoming calls from the particular originator, and the output control unit may specify one of the two or more levels of the relative mail reception frequency when an incoming mail is received, and one of the two or more levels of the relative call reception frequency when an incoming call is received.

According to the mobile phone, since different ringtones are output depending on a type of a communication (a call or a mail) from an originator, a user can know the communication reception frequency with respect to each of an incoming call and an incoming mail, and can specify the type of the communication from a ringtone.

[Industrial Applicability]

The mobile phone of the present invention is used to determine a ringtone output when an incoming call or mail is received.

[Reference Signs List]
1 first housing
2 second housing
3 speaker
4 microphone
5 set of keys
6 receiver
100, 200 mobile phone
110 display screen
120 communication unit
130 audio processing unit
131 timing unit
140, 210 storage unit
150, 220 control unit
151, 221 setting unit
152, 222 calculation unit
153 display control unit
154, 223 output control unit

The invention claimed is:

1. A mobile phone comprising:
a speaker;
an audio data storage unit configured to store therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator; and
an output control unit configured to, when an incoming communication is received, specify, from among the levels, a level of the relative communication reception frequency for an originator of the received incoming communication, and output a ringtone from the speaker based on one of the audio data pieces corresponding to the specified level.

2. The mobile phone of claim 1 further comprising a setting unit configured to receive from a user, for each of the levels, designation of a different one of the audio data pieces to be associated therewith, and associate the designated audio data piece with the level.

3. The mobile phone of claim 2, wherein the levels are approximately even divisions of a range of values of the relative communication reception frequency.

4. The mobile phone of claim 2, wherein the levels include a level of the relative communication reception frequency that corresponds to the frequency of receiving incoming communications from the particular originator.

5. The mobile phone of claim 2, wherein the levels include a level of the relative communication reception frequency that corresponds to less than half of the frequency of receiving incoming communications from the particular originator.

6. The mobile phone of claim 1 further comprising:

a history storage unit configured to store therein a history of receiving incoming communications at least during a time period from a given time point in the past to the present;

a frequency storage unit configured to store therein frequency information indicating frequency of receiving incoming communications from each of the originators; and a calculation unit configured to, at regular time intervals, calculate frequency of receiving incoming communications from each of the originators during the time period from the given time point in the past to the present based on the history stored in the history storage unit, and store the calculated frequency in the frequency storage unit as the frequency information.

7. The mobile phone of claim 1, wherein each incoming communication is an incoming mail or call, the levels of the relative communication reception frequency include two or more levels of relative mail reception frequency and two or more levels of relative call reception frequency, the relative mail reception frequency being calculated for each of the originators and indicating a ratio of frequency of receiving incoming mails from the originator to frequency of receiving incoming mails from the particular originator, the relative call reception frequency being calculated for each of the originators and indicating a ratio of frequency of receiving incoming calls from the originator to frequency of receiving incoming calls from the particular originator, and the output control unit specifies one of the two or more levels of the relative mail reception frequency when an incoming mail is received, and one of the two or more levels of the relative call reception frequency when an incoming call is received.

8. A ringtone output control method for use in a mobile phone including: a speaker; and an audio data storage unit for storing therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator, the output control method comprising:

a specification step of, when an incoming communication is received, specifying, from among the levels, a level of the relative communication reception frequency for an originator of the received incoming communication; and an output step of outputting a ringtone from the speaker based on one of the audio data pieces corresponding to the specified level.

9. A non-transitory computer-readable recording medium having recorded thereon a program for causing a computer included in a mobile phone to perform ringtone output control processing, the mobile phone including:

a speaker; and an audio data storage unit for storing therein a plurality of audio data pieces in one-to-one correspondence with a plurality of levels of relative communication reception frequency, the relative communication reception frequency being calculated for each of a plurality of originators and indicating a ratio of frequency of receiving incoming communications from the originator to frequency of receiving incoming communications from a particular originator, wherein the output control processing includes:

a specification step of, when an incoming communication is received, specifying, from among the levels, a level of the relative communication reception frequency for an originator of the received incoming communication; and an output step of outputting a ringtone from the speaker based on one of the audio data pieces corresponding to the specified level.

* * * * *